(12) United States Patent
Noble

(10) Patent No.: US 11,149,852 B2
(45) Date of Patent: Oct. 19, 2021

(54) SEALING DEVICE, SYSTEM AND METHOD

(71) Applicant: Pure Vista Ltd, Bodmin (GB)

(72) Inventor: Angus Noble, Darlington (GB)

(73) Assignee: Pure Vista Ltd., Bamin (GB)

( * ) Notice: Subject to any disclaimer, the term of this patent is extended or adjusted under 35 U.S.C. 154(b) by 134 days.

(21) Appl. No.: 16/410,166

(22) Filed: May 13, 2019

(65) Prior Publication Data

US 2020/0011420 A1 Jan. 9, 2020

(30) Foreign Application Priority Data

Jul. 4, 2018 (GB) ..................................... 1810955

(51) Int. Cl.
*F16J 15/02* (2006.01)
*F16J 15/06* (2006.01)
*F16B 33/00* (2006.01)
*F16H 25/24* (2006.01)
*F16J 15/08* (2006.01)

(52) U.S. Cl.
CPC ........... *F16J 15/061* (2013.01); *F16B 33/004* (2013.01); *F16H 25/2418* (2013.01); *F16J 15/0806* (2013.01)

(58) Field of Classification Search
CPC ........ F16J 15/061; F16J 15/0806; F16J 15/14; F16B 33/004; F16H 25/2418
See application file for complete search history.

(56) References Cited

U.S. PATENT DOCUMENTS

| | | | | |
|---|---|---|---|---|
| 6,102,407 A | * | 8/2000 | Moriya | E04B 1/6816 277/316 |
| 9,340,336 B2 | * | 5/2016 | Mullaney | B65D 21/0227 |
| 2010/0320694 A1 | * | 12/2010 | Gromotka | H05K 5/069 277/316 |
| 2011/0171562 A1 | * | 7/2011 | Budinski | H01M 8/0267 429/510 |

* cited by examiner

*Primary Examiner* — Gilbert Y Lee
(74) *Attorney, Agent, or Firm* — Ryan Alley IP

(57) ABSTRACT

Securing a channel section 7 onto a pre-existing substrate 9 using screws 11 requires any water-impermeable layer on the substrate 9 to be compromised. In particular, water present on a head of a screw 11 may wick (i.e. via capillary action) along the thread of a screw, past the water-impermeable layer, and into the core of the substrate 9. The present invention provides a sealing device with a fluid inlet 6 for injecting fluid sealant therethrough to surround a screw 11, thereby preventing wicking of water along threads of the screw.

5 Claims, 8 Drawing Sheets

SEALING DEVICE, SYSTEM AND METHOD

RELATED APPLICATIONS

This application claims priority under 35 U.S.C. § 119 to co-pending UK Application GB1810955.3, filed Jul. 4, 2018, which is incorporated by reference herein in its entirety.

BACKGROUND

Field

The present invention relates generally to a sealing device and system, and a method of preventing water penetration into a substrate and finds particular, although not exclusive, utility in forming glass panel balustrades on flat rooves.

It is often necessary to secure sections of channels or troughs onto a substantially flat, substantially horizontal surface such as a flat roof. Such channel/trough sections can be used to secure flat panels (e.g. glass) in place to act as a barrier and/or decoration.

Securing a channel section onto a pre-existing substrate requires use of some form of fixing. Often, screws, nails or bolts are used, specifically by passing through a channel section and into the substrate. For example, a shank of a screw may pass through a hole in a channel section, the hole sized to prevent passage of a head of the screw therethrough. A thread on the shank of the screw may engage into the substrate (e.g. self-tapping).

Such substrates often include a water-impermeable layer (e.g. of a plastics and/or resin material) over a core (e.g. wood). Screws or other fixings used to secure a channel section to a substrate are therefore required to pass through the water-impermeable layer, potentially compromising its effectiveness. In particular, water present on a head of a screw may wick (i.e. via capillary action) along the thread of a screw, past the water-impermeable layer, and into the core of the substrate.

SUMMARY

According to a first aspect of the present invention, there is provided a sealing device for preventing water penetration into a substrate to which a channel section is secured, the sealing device comprising: a peripheral barrier having: a first substantially flat surface configured to be engageable with a substrate; a second substantially flat surface opposite the first substantially flat surface, the second substantially flat surface configured to be engageable with a channel section; and a fluid inlet; the peripheral barrier defining a region into which a fluid sealant may be injected via the fluid inlet; the sealing device configured to allow a fixing to pass through the region from the channel section to the substrate.

In this way, fluid sealant may be injected into the region surrounding the fixing to prevent wicking of water along threads of the fixing (or water penetration by other means).

The peripheral barrier may comprise metal (e.g. aluminium) and/or a plastics material. The peripheral barrier may be moulded.

The first substantially flat surface may be substantially planar. The first substantially flat surface may be resilient; that is, it may be configured to conform to a substrate onto which it is placed.

The first substantially flat surface configured to be engageable with the substrate may comprise the first substantially flat surface configured to be placed upon the substrate.

The second substantially flat surface may be substantially planar. The first substantially flat surface may be resilient; that is, it may be configured to conform to a channel that is placed thereon. The first substantially flat surface may be shaped to mate with the channel section.

Opposite the first substantially flat surface my mean that the first substantially flat surface is substantially parallel to the second substantially flat surface, and/or that the first substantially flat surface is located at a first extreme of the peripheral barrier, and the second substantially flat surface is located at a second extreme of the peripheral barrier distal from the first substantially flat surface.

The fluid inlet may comprise a passage from an exterior of the peripheral barrier to an interior of the peripheral barrier. The fluid inlet may comprise a valve and/or closure.

The region may be disposed on an interior of the peripheral barrier.

The fluid sealant may comprise an anaerobic sealant, such as an anaerobic acrylic sealant. The fluid sealant may comprise acrylic resin, butyl rubber, epoxy thermoset, foam, wax, latex sealant, polysulfide sealant, polyurethane sealant, rubber sealant, silicone sealant, urethane sealant, varnish, and/or any other suitable sealant. The fluid sealant may be configured to set and/or cure after injection into the region.

Injection may comprise pushing through the fluid inlet under pressure.

The peripheral barrier may be configured to allow a fixing to project through the first substantially flat surface, through the region, and through the second substantially flat surface. The peripheral barrier may be configured to engage with the fixing, or alternatively to be spaced from the fixing.

The first and/or second substantially flat surface may comprise an annulus and/or ring shape, thereby defining an inner zone through which the fixing may pass.

According to a second aspect of the present invention, there is provided a sealing system for preventing water penetration, comprising: a substrate; a channel section; and a sealing device according to the first aspect.

Optionally, the sealing system may comprise fluid sealant and/or a fixing.

According to a third aspect of the present invention, there is provided a method of preventing water penetration into a substrate to which a channel section is secured, the method comprising the steps of: providing a sealing device according to the first aspect; engaging the first substantially flat surface with a substrate; engaging the second substantially flat surface with a channel section; securing the channel section to the substrate with a fixing device arranged to pass through the region from the channel section to the substrate; and injecting a fluid sealant into the region via the fluid inlet.

The fluid sealant may be allowed to cure, dry or harden.

BRIEF DESCRIPTION OF THE DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION

Figure 1:
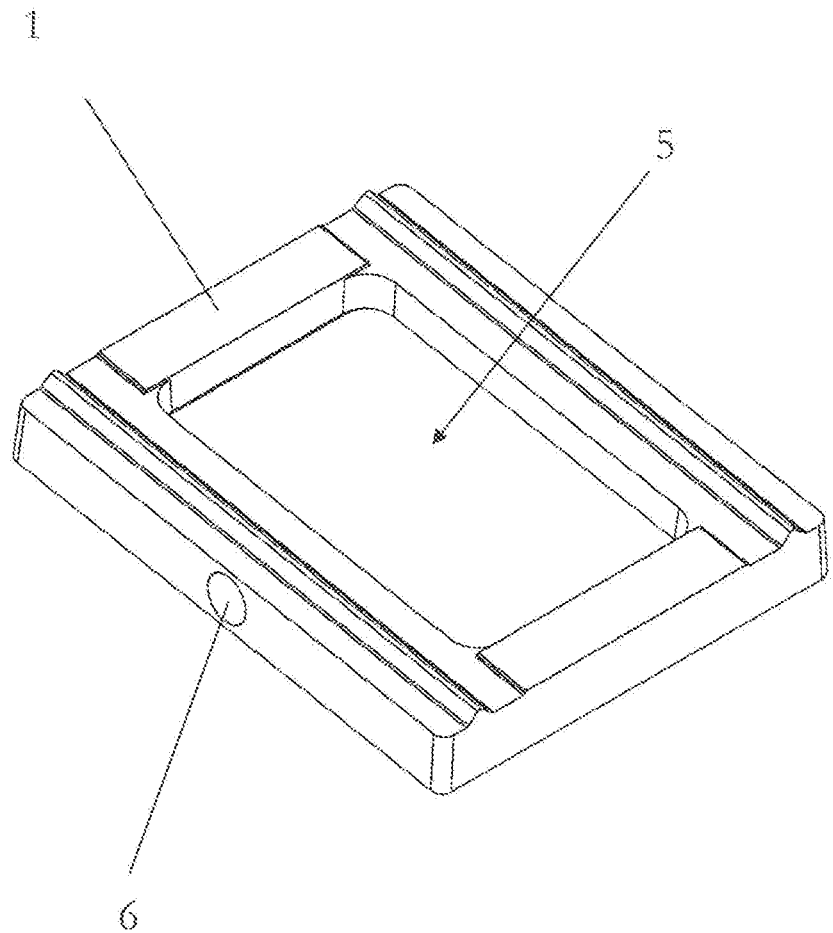
FIG. 1 is a perspective view of a first sealing device.

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "connected", used in the description, should not be interpreted as being restricted to direct connections only. Thus, the scope of the expression "a device A connected to a device B" should not be limited to devices or systems wherein an output of device A is directly connected to an input of device B. It means that there exists a path between an output of A and an input of B which may be a path including other devices or means. "Connected" may mean that two or more elements are either in direct physical or electrical contact, or that two or more elements are not in direct contact with each other but yet still co-operate or interact with each other. For instance, wireless connectivity is contemplated.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 is a perspective view of a first annular sealing device, comprising an upper surface 1, a lower surface (not shown), an interior region 5, and a fluid inlet 6 for injecting sealant into the interior region 5. The sealing device is shown as rectangular, as is conventional for spacers in the field of mounting channel sections; however, other shapes are envisaged, such as square or circular.

Figure 2:
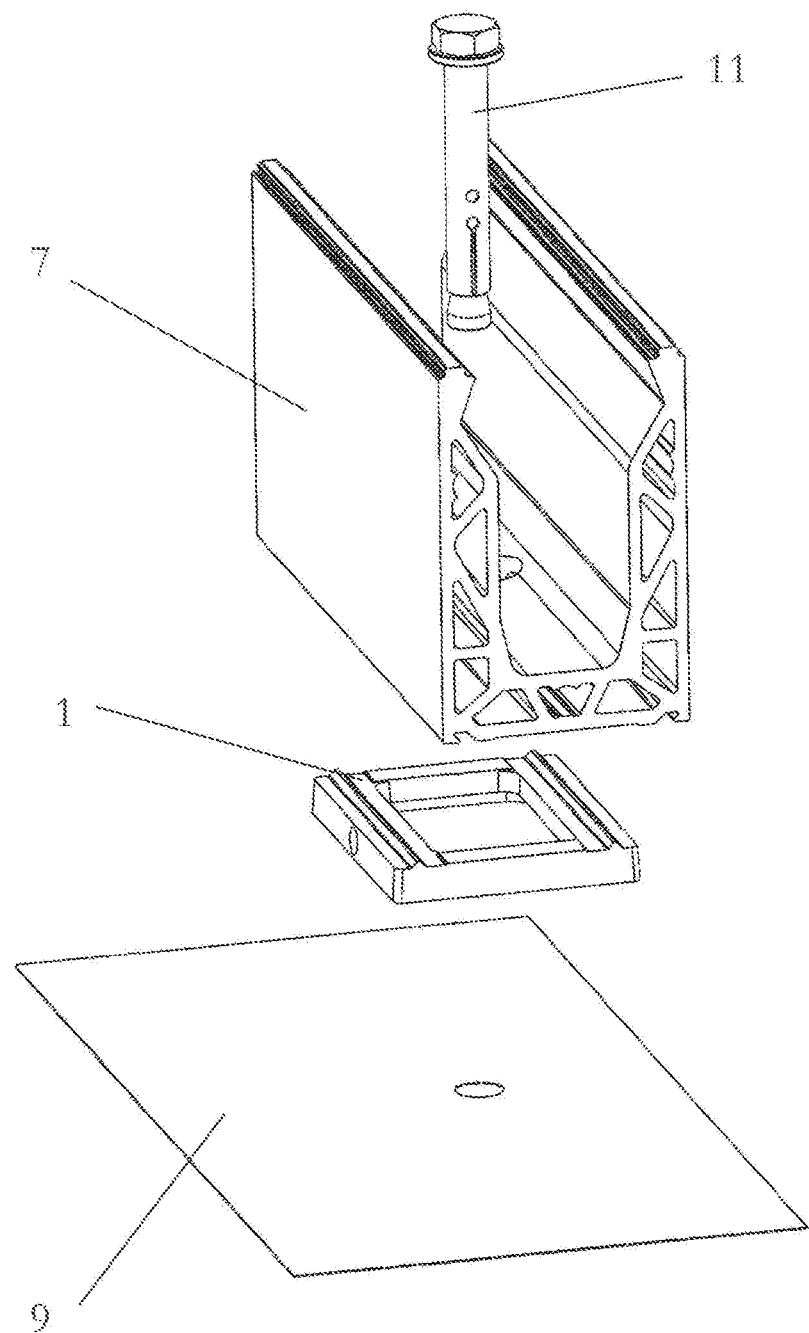
FIG. 2 is an exploded view of a first sealing system incorporating the first sealing device.

FIG. 2 is an exploded view of a first sealing system incorporating the first annular sealing device, a channel section 7, a substrate 9, and a fixing 11 for securing the channel section 7 to the substrate 9. As can be seen, the upper surface 1 of the first annular sealing device is shaped to mate with an underside of the channel section 7.

Figure 3:
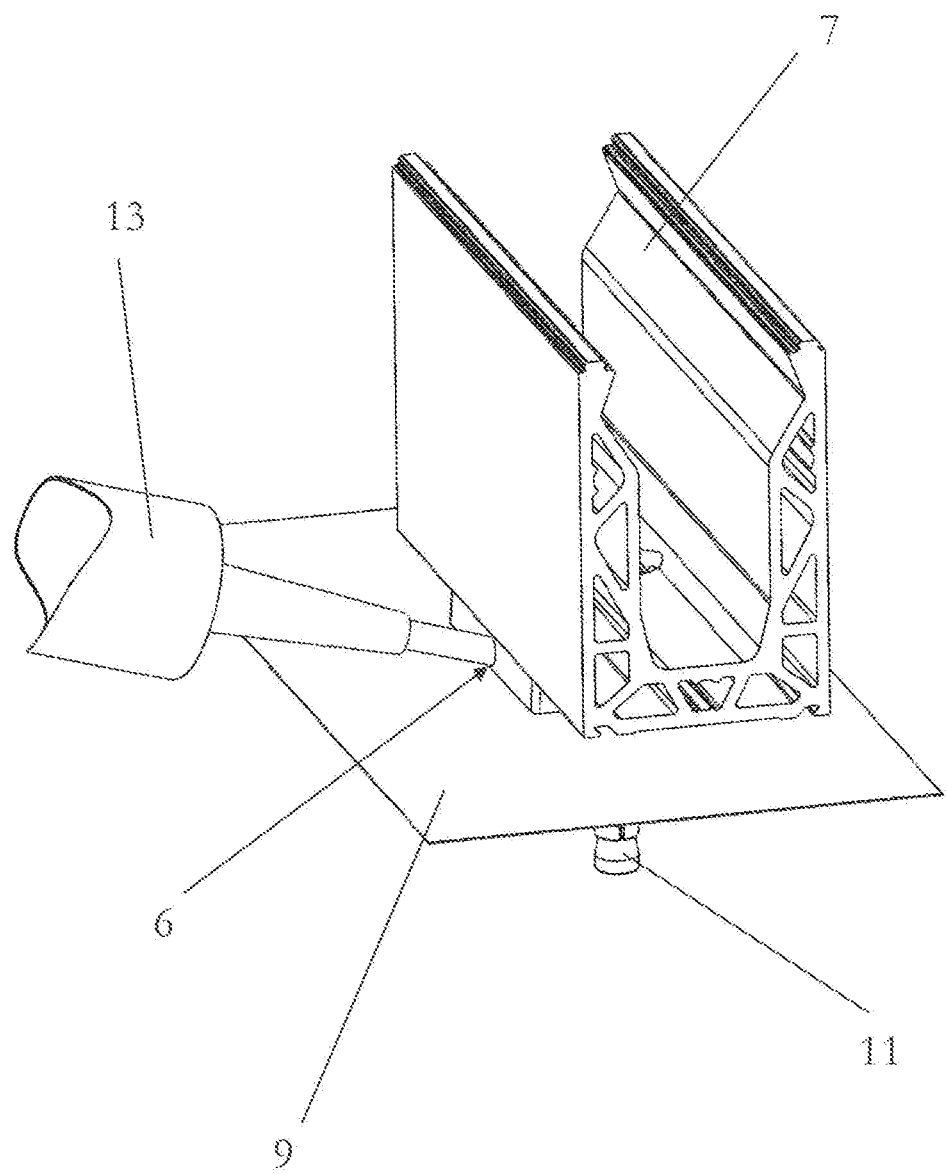
FIG. 3 is a perspective view of the first sealing system.

FIG. 3 is a perspective view of the first sealing system showing sealant 13 being injected into the region (not shown) via the fluid inlet 6.

Figure 4:
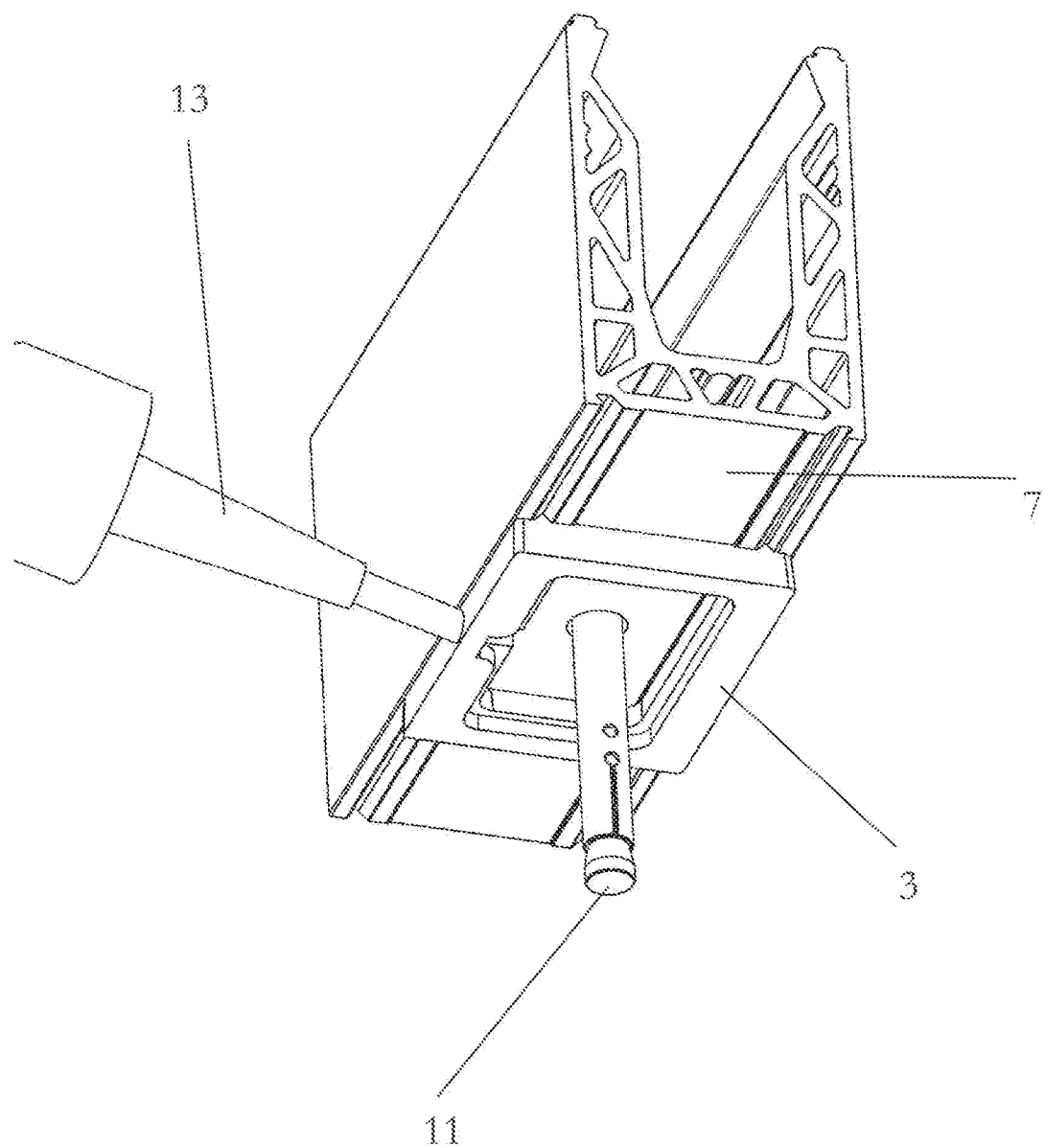
FIG. 4 is an alternative perspective view of the first sealing system.

FIG. 4 is an alternative perspective view of the first sealing system with the substrate removed for clarity. The lower surface 3 of the sealing device can be seen to substantially smooth.

Figure 5:
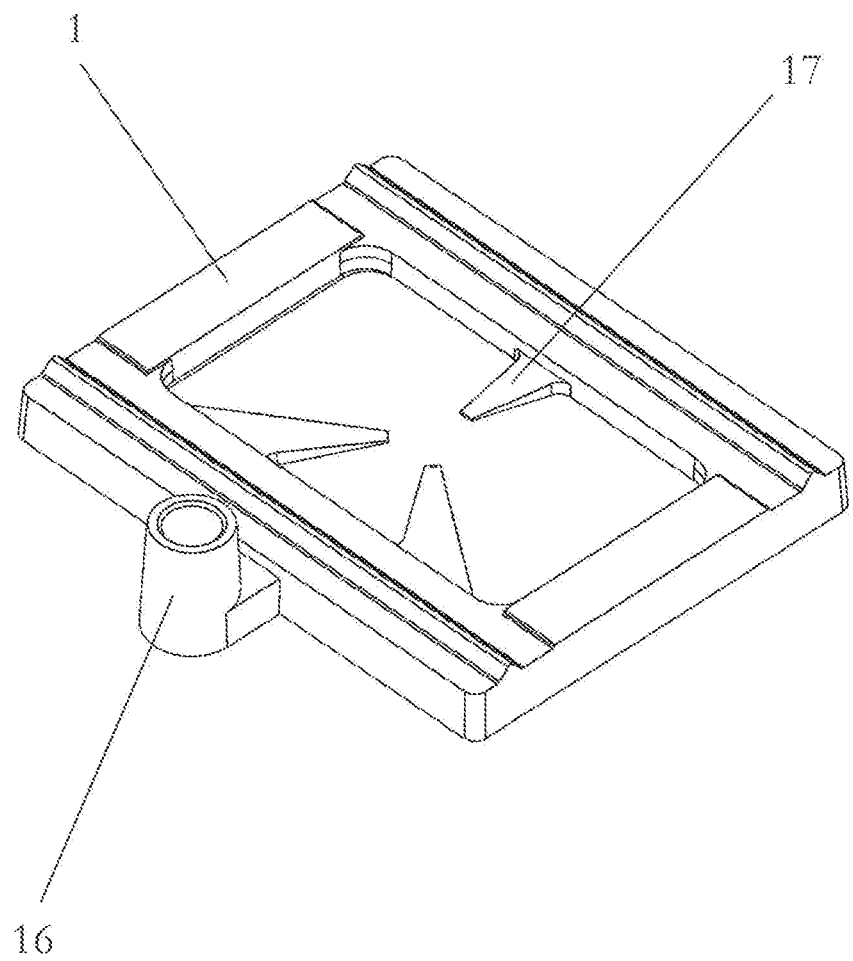
FIG. 5 is a perspective view of a second sealing device.

FIG. 5 is a perspective view of a second annular sealing device similar to the first annular sealing device, but incorporating an extended fluid inlet 16 for ease of injection of sealing fluid. The extended fluid inlet 16 may be frangible, such that it may be broken off (or otherwise removed) after sealant is injected.

In addition, FIG. 5 shows three inwardly projecting ribs 17 to help locate and/or secure the sealing device in place.

Figure 6:
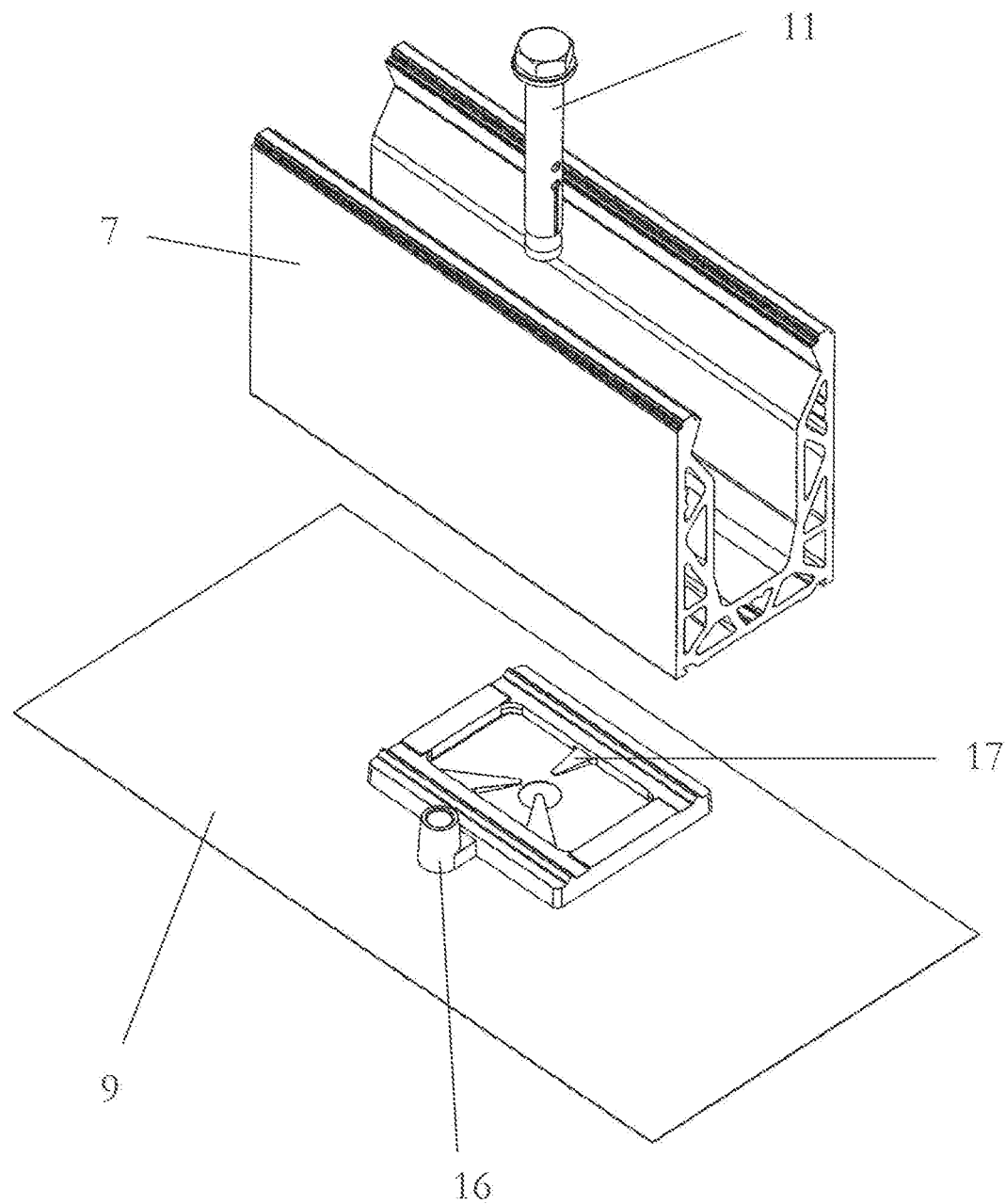
FIG. 6 is an exploded view of a second sealing system incorporating the second sealing device.

FIG. 6 is an exploded view of a second sealing system incorporating the second sealing device, a channel section 7, a substrate 9, and a fixing 11 for securing the channel section 7 to the substrate 9.

Figure 7:
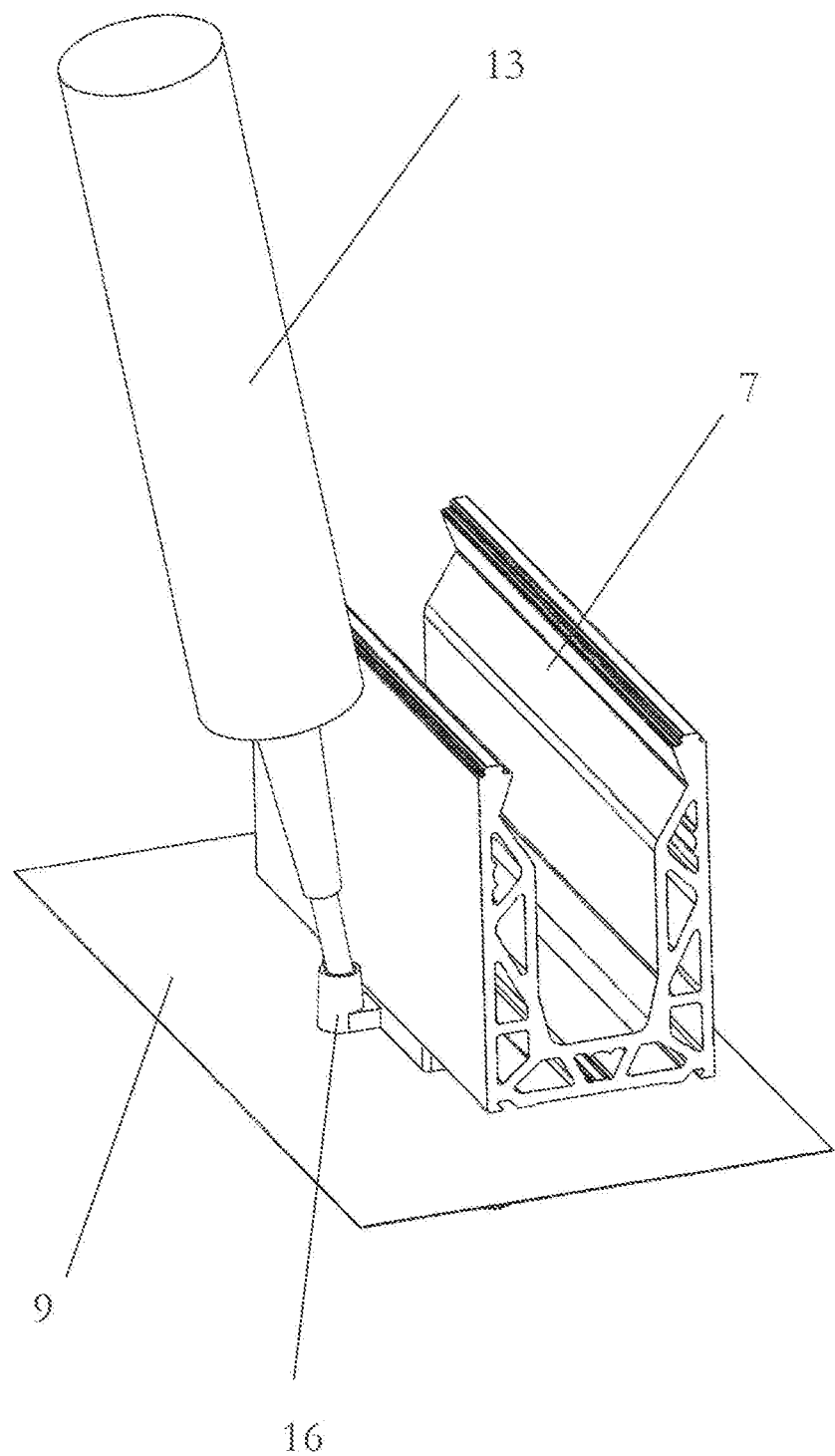
FIG. 7 is a perspective view of the second sealing system.

FIG. 7 is a perspective view of the second sealing system showing sealant 13 being injected into the region (not shown) via the fluid inlet 16.

Figure 8:
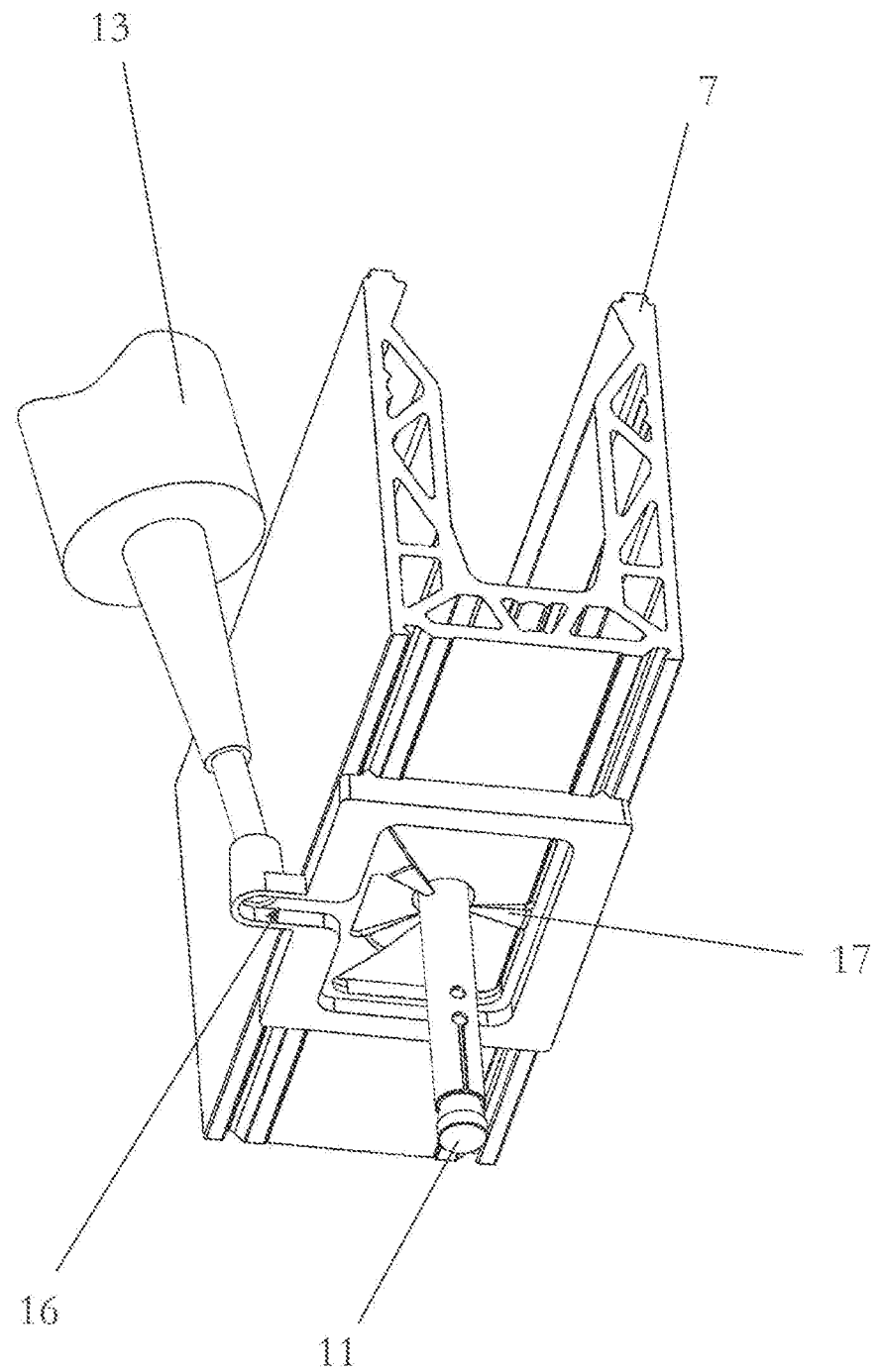
FIG. 8 is an alternative perspective view of the second sealing system.

FIG. 8 is an alternative perspective view of the second sealing system the substrate removed for clarity.

The invention claimed is:

1. A sealing device for preventing water penetration into a substrate to which a channel section is secured, the sealing device comprising:
    a peripheral barrier having,
        a first substantially flat surface configured to be engageable with the substrate, wherein the first substantially flat surface is resilient,
        a second substantially flat surface opposite the first substantially flat surface, wherein the second substantially flat surface is resilient and configured to be engageable with the channel section, and
        a fluid inlet, wherein,
            the peripheral barrier defines a region into which a fluid sealant may be injected via the fluid inlet,
            the sealing device is configured to allow a fixing to pass through the region from the channel section to the substrate, and
            the peripheral barrier is configured to be spaced away from the fixing.

2. The sealing device of claim 1, wherein the peripheral barrier is configured to engage with the fixing.

3. A sealing system for preventing water penetration, comprising:
    the substrate;
    the channel section; and
    the sealing device according to claim 1.

4. A method of preventing water penetration into a substrate to which a channel section is secured, the method comprising:
    providing the sealing device according to claim 1;
    engaging the first substantially flat surface with the substrate;
    engaging the second substantially flat surface with the channel section;
    securing the channel section to the substrate with a fixing device arranged to pass through the region from the channel section to the substrate; and
    injecting a fluid sealant into the region via the fluid inlet.

5. The method of claim 4, further comprising:
    allowing the fluid sealant to harden within the region.

* * * * *